United States Patent [19]

Rödder

[11] Patent Number: 4,716,051

[45] Date of Patent: Dec. 29, 1987

[54] IMPREGNATION OF CONCRETE IN DEPTH

[75] Inventor: Karl-Martin Rödder, Troisdorf-Spich, Fed. Rep. of Germany

[73] Assignee: Dynamit Nobel AG, Troisdorf Bez Koeln, Fed. Rep. of Germany

[21] Appl. No.: 801,792

[22] Filed: Nov. 26, 1985

Related U.S. Application Data

[63] Continuation of Ser. No. 689,034, Jan. 7, 1985, abandoned, which is a continuation of Ser. No. 514,186, Jul. 15, 1983, abandoned.

[30] Foreign Application Priority Data

Jul. 31, 1982 [DE] Fed. Rep. of Germany ....... 3228660

[51] Int. Cl.$^4$ ............................ B05C 1/16; B05D 5/10
[52] U.S. Cl. .................................. 427/136; 427/387; 427/393.6
[58] Field of Search ............... 427/136, 387, 393.6, 427/314; 428/447

[56] References Cited

U.S. PATENT DOCUMENTS

| 3,244,541 | 4/1966 | Fain et al. ............................ 106/13 |
|---|---|---|
| 3,258,382 | 6/1971 | Vincent ................................ 156/329 |
| 3,457,099 | 7/1969 | DeAnielo ......................... 427/393.6 |
| 3,589,917 | 6/1971 | Hedlund ............................... 106/12 |
| 4,125,673 | 11/1978 | Roth et al. ....................... 427/393.6 |
| 4,170,690 | 10/1979 | Armbruster et al. ............. 427/393.6 |
| 4,342,796 | 8/1982 | Brown et al. ....................... 427/136 |

FOREIGN PATENT DOCUMENTS 55-102673 8/1970 Japan ................................ 427/393.6

OTHER PUBLICATIONS

Organosilicon Compounds for Synthesizing High-polymeric Liquids and Lubricants, by K. A. Andrianov, Feb. 2, 1945, pp. 1–5.

Primary Examiner—Sadie L. Childs
Attorney, Agent, or Firm—Felfe & Lynch

[57] ABSTRACT

Solvent-free alkyl trialkoxy-silanes whose alkyl groups have 2 to 8 carbon atoms and whose alkoxy groups have 1 or 2 carbon atoms are used for the in-depth hydrophobic impregnation of concrete. Propyl and isobutyl trialkoxy-silanes display an especially deeply penetrating hydrophobizing action which is greater than that of solutions of these silanes.

7 Claims, No Drawings

IMPREGNATION OF CONCRETE IN DEPTH

This is a continuation application of U.S. Ser. No. 689,034, filed Jan 7, 1985, which is a continuation application of U.S. Ser. No. 514,186, filed July 15, 1983; both are abandoned.

BACKGROUND OF THE INVENTION

The subject matter of the present invention is in a method for the in-depth hydrophobic impregnation of concrete by the use of alkyl trialkoxysilanes.

It is known from German Patent No. 2,029,446 to impregnate porous building materials, including concrete, with alkyl trialkoxysilanes. The impregnation is performed by applying solutions of the silanes to the surface of the building materials. Alcohols are named as the preferred solvents in this patent, because the best impregnation effect is achieved with these solvents.

The good impregnating effect of alcoholic solutions of the alkylsilanes has heretofore been explained on the basis that they are especially able to penetrate into the material, the alcohol being considered as a particularly good transport medium permitting a deep penetration of the silane into the material.

The use of this known alkyl silane solution in the rendering of concrete hydrophobic, however, has the following disadvantage: since the pore volume of concrete is generally very small, and better quality concrete is of lower pore volume, relatively little alkyl silane solution can penetrate into the concrete in a single application of this solution. The small pore volume in contact with the atmosphere, as is the case in virtually all concrete construction, is more or less filled with water because of exposure to atmospheric water vapor. The alkyl silane solution therefore is unable to penetrate sufficiently deeply into the surface to produce long-term action of the silanes.

The action of alkyl trialkoxysilanes in rendering a surface hydrophobic is known to be based on the fact that, on account of the atmospheric moisture, and in some cases the water that is on the surface, alkyl silanols are formed intermediately, whose hydroxyl groups react with the hydroxyl groups of the material to be rendered hydrophobic, and with other hydroxyl groups of the silanol resulting in the formation of alkyl siloxanes. A bond is thus produced between alkyl siloxanes and the mineral boundary surface. This boundary surface bond greatly increases the boundary surface tension of the mineral materials with respect to water and the body becomes hydrophobic. The degree of the water repellency depends on the nature of the alkyl group. The bond between this alkyl group and the silicon atom of the alkyl silanes, however, can be destroyed by energy-rich radiation, such as ultraviolet light, for example.

The long-term hydrophobic effect obtained with alkyl silanes therefore depends on the extent that light rays and ultraviolet rays are able to destroy the Si—C bond in the system. The more deeply the silane can penetrate into the surface of the body to be protected, the less will be the destructive action of light and ultraviolet rays and the greater will be the long-term effect of the silane.

The prior art thus faced the problem in rendering concrete hydrophobic with alkylsilanes, of finding methods of causing the silane to penetrate deeper into the surface of the concrete. The obvious solution to this problem, repeated application of silane solutions after the solvent has evaporated, requires periods of waiting, is labor-intensive, and causes losses of silane because some silane is carried off by the evaporation of the solvent.

It is already known from DE-AS No. 1,796,012 to apply silanes as well as other substances to the surface of concrete. The object in that case was, however, to make the concrete resistant to spalling and chipping. For this reason the silane is applied to the still unset concrete. In the present case, however, an already set concrete is treated with the silane, so that nothing could have been learned from this "Auslegeschrift" toward the solution of the above described problem.

BRIEF SUMMARY OF THE INVENTION

A method has been found for the hydrophobic impregnation of concrete in depth by treating its surface with alkyl trialkoxysilanes, which is characterized in that alkyl trialkoxysilanes whose alkyl groups have 3 to 8 carbon atoms and whose alkoxy groups have 1 to 2 carbon atoms are used without solvent.

Surprisingly, alkyl trialkoxysilanes whose alkyl groups contain 3 to 8 carbon atoms and whose alkoxy groups have 1 to 2 carbon atoms penetrate deeply into the surface of concrete without solvent. Particularly good penetration depths clearly exceeding the penetration depths of the corresponding high concentration silane solutions are obtained with alkyl trialkoxysilanes whose alkyl groups contain 3 or 4 carbon atoms.

Specific alkyl trialkoxy compounds which may be mentioned are as follows:
propyl trimethoxy silane;
propyl triethoxy silane;
isopropyl trimethoxy silane;
isopropyl triethoxy silane;
butyl trimethoxy silane;
butyl triethoxy silane;
iso butyl trimethoxy silane;
iso butyl triethoxy silane;
sec butyl trimethoxy silane;
sec butyl triethoxy silane;
tert butyl trimethoxy silane; and
tert butyl triethoxy silane.

The application of the silanes to the concrete surface is performed in a generally known manner, e.g., by dipping, brushing, spreading, spraying or flooding with the silane. Generally, as much silane is applied as the concrete will absorb. The point at which no more silane will be absorbed is generally indicated by the fact that the silane remains standing on the surface of the concrete for longer than about one minute, and the surface during this time remains quite moist with the silane.

The concrete surface can be either dry or moist with water. However, there must be no water standing on it. It is important only that the surface is able to absorb the silane; therefore it must not be soiled, for example, by dust, salt, salt solutions or oil to such an extent that the absorptive action is appreciably reduced. Surfaces so contaminated must be cleaned by known methods prior to the application.

The concrete that can be treated is mainly heavy concrete and those kinds of concrete into which alcoholic alkylsilane solutions do not penetrate sufficiently deeply. However, light-weight concrete can also be treated in the same manner. The concrete is to be in the set condition.

The set concrete can be either a finished structure or building, or a finished component that it not yet assembled, such as for example a concrete slab. Buildings or structures which can be treated in accordance with the invention are, for example, roads, bridges, take-off and landing strips at airfields, dams, or other concrete structures including prestressed concrete structures. The method of producing such structures is not important as far as the treatment is concerned.

BRIEF DESCRIPTION OF PREFERRED EMBODIMENTS

Concrete test bodies measuring 14.0×6.0×6.0 cm, which were obtained by cutting up larger premanufactured concrete slabs, were immersed in the alkylsilane solutions specified in Tables 1 to 3, having different concentrations of alkyl silane. The time of immersion was 10 seconds in each case. Then, in two series of tests, the brick was removed, drained off, and then dipped again into the impregnating solution for 10 seconds. The tests performed with the solvents serve for purposes of comparison.

After the immersion, the test bodies were stored for one week outdoors at relative atmospheric humidities of more than 60% and then they were broken. The fresh fracture surface was dipped in water. The layer made water-repellent by the alkyl silane is not wetted by the water and is easy to distinguish from the darkened area which had not been made water-repellent and therefore was wetted by the water. The depth of the hydrophobic layer was measured. The following tables give the results.

silane solutions of 90% silane produce depths of penetration far less than those which are obtained when no solvent is used. The increase in depth of penetration of hydrophobicity when treated with pure solvent free alkyl trialkoxysilane over that from concentrated silane solutions is substantial and to a degree that was not anticipated.

It will be understood that the specification and examples are illustrated but not limitative of the present invention and that other embodiments within the spirit and scope of the invention will suggest themselves to those skilled in the art.

What is claimed is:

1. A method for hydrophobizing depth-impregnation of a set heavy concrete comprising treating at least one surface of the set heavy concrete with a solvent free alkyl trialkoxysilane wherein the alkyl group has 3 to 8 carbon atoms and the alkoxy group has 1 or 2 carbon atoms.

2. The method of claim 1 wherein the alkyl trialkoxysilane is propyl trialkoxysilane.

3. The method of claim 1 wherein the alkyl trialkoxysilane is isobutyl trialkoxysilane.

4. The method of claim 2 wherein the alkyl trialkoxysilane is propyl trimethoxysilane.

5. The method of claim 3 wherein the alkyl trialkoxysilane is isobutyl trimethoxysilane.

6. The method of claim 1 wherein the alkyl trialkoxysilane is selected from the group consisting of propyl triethoxysilane, isopropyl trimethoxysilane, isopropyl triethoxysilane, butyl trimethoxysilane, butyl triethoxysilane, sec butyl trimethoxy silane, sec butyl triethoxy

TABLE 1

| Alkylsilane | Conc. | Solvent | Concrete quality (according DIN 1045) | Time of Immersion | Penetration Depth |
|---|---|---|---|---|---|
| Propyltrimethoxy-silane | 20% | Ethanol | B 25 PZ | 2 × 10 sec | 3 mm |
| | 40% | " | " | " | 5 mm |
| | 60% | " | " | " | 8 mm |
| | 80% | " | " | " | 9 mm |
| | 100% | — | " | " | 12 mm |

TABLE 2

| Alkylsilane | Conc. | Solvent | Concrete quality (according DIN 1045) | Time of Immersion | Penetration Depth |
|---|---|---|---|---|---|
| Iso-Butyltri-methoxy-silane | 20% | Ethanol | B 45 PZ | 1 × 10 sec | 1 mm |
| | 40% | " | " | " | 2 mm |
| | 60% | " | " | " | 3 mm |
| | 80% | " | " | " | 3.5 mm |
| | 100% | — | " | " | 6 mm |

TABLE 3

| Alkylsilane | Conc. | Solvent | Concrete quality (according DIN 1045) | Time of Immersion | Penetration Depth |
|---|---|---|---|---|---|
| Iso-Butyltri-methoxy-silane | 20% | Ethanol | B 45 PZ | 2 × 10 sec | 2 mm |
| | 40% | " | " | " | 3.5 mm |
| | 60% | " | " | " | 4.5 mm |
| | 80% | " | " | " | 5 mm |
| | 100% | — | " | " | 8 mm |

The tables show that the depth of penetration of the silane hydrophobation using solvent-free silane is the greatest. If, however, even concentrated solutions of 80% silane content are used, the depths of penetration are considerably lower and are about 25 to 42% below the values which are obtained without solvent. Even silane, tert-butyl trimethoxy silane and tert-butyl triethoxy silane.

7. The method of claim 1, wherein the concrete is relatively impermeable.

* * * * *